April 2, 1929.  W. F. MacGREGOR  1,707,310
COMBINATION HARVESTER THRASHER
Original Filed March 24, 1923  3 Sheets-Sheet 1
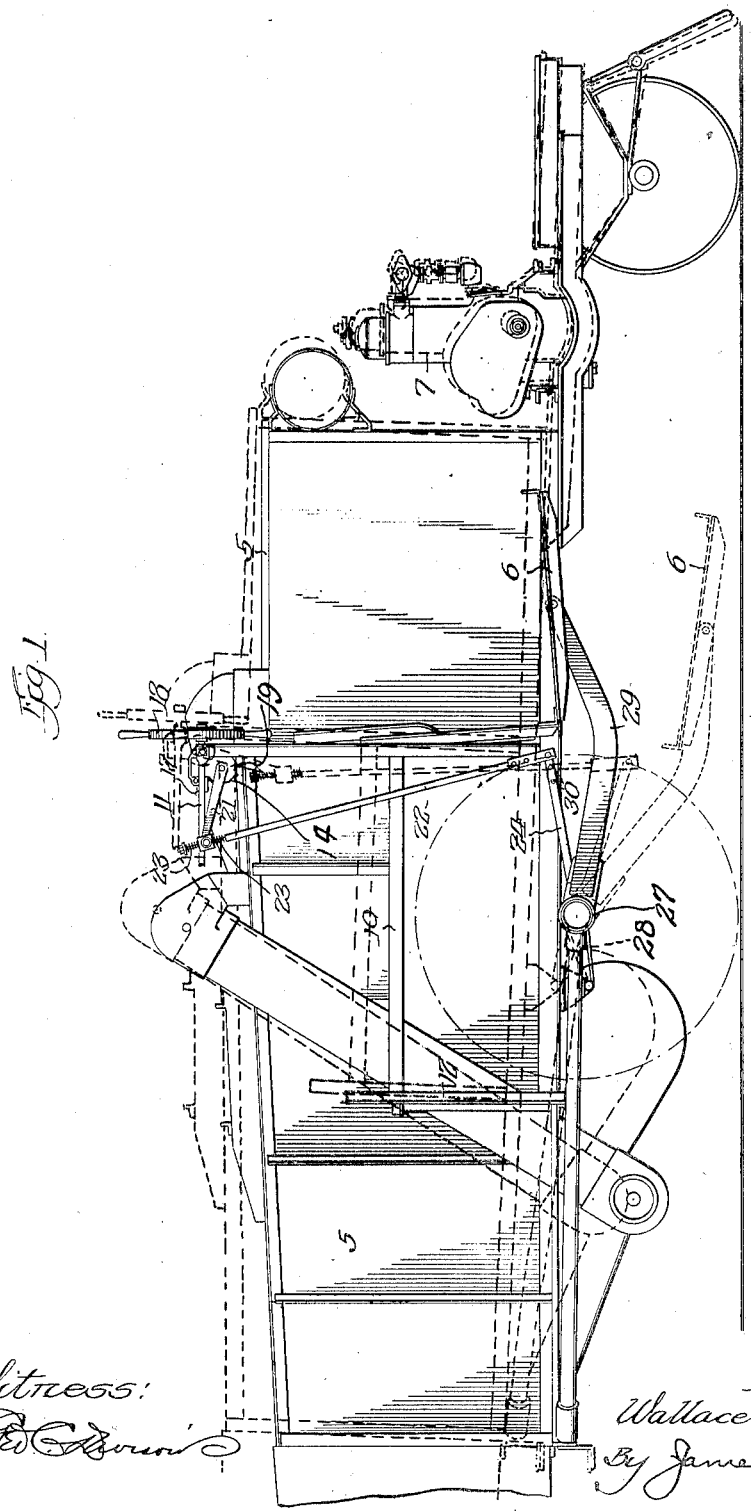

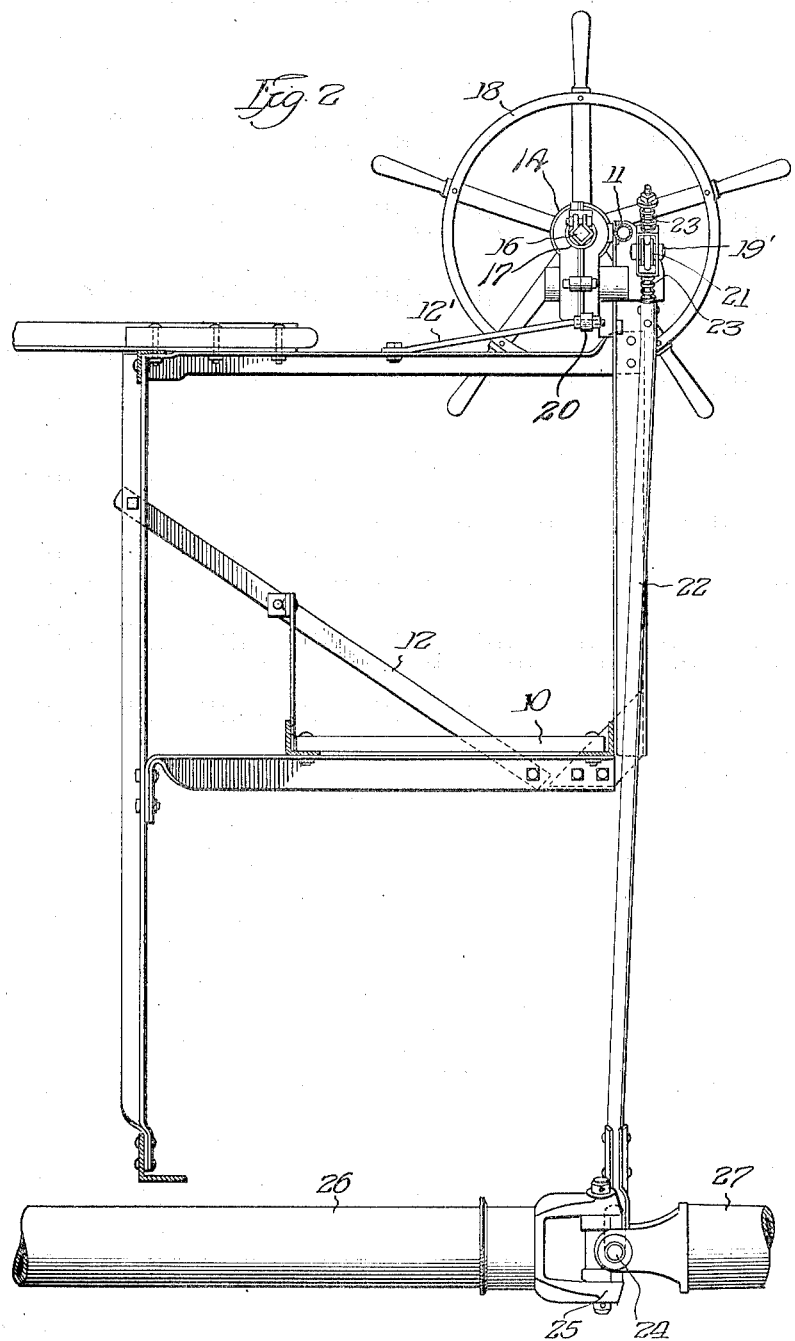

April 2, 1929.    W. F. MacGREGOR    1,707,310
COMBINATION HARVESTER THRASHER
Original Filed March 24, 1923    3 Sheets-Sheet 3
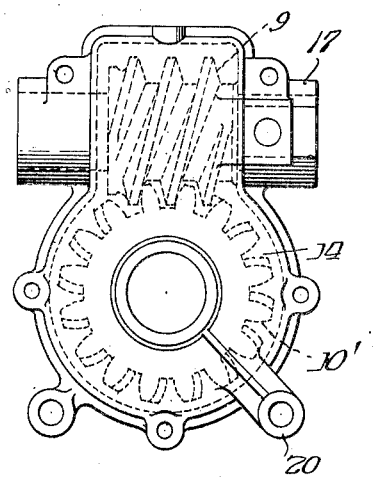
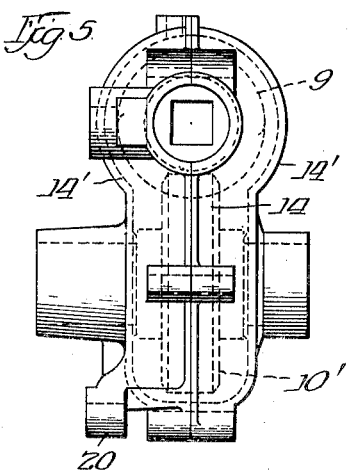
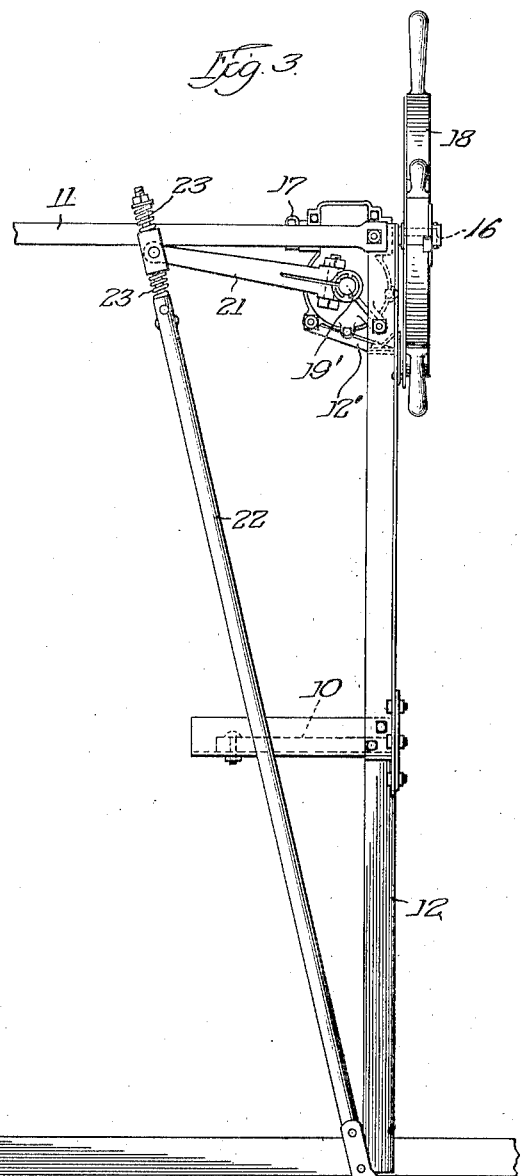
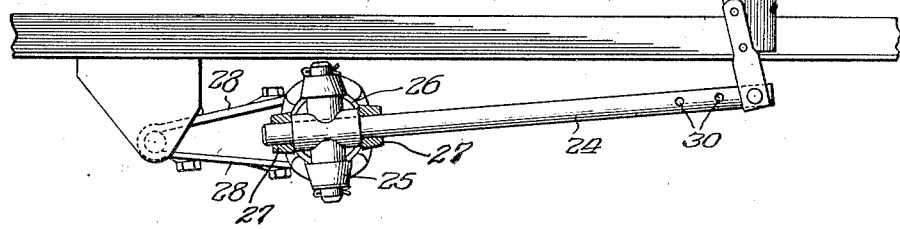

Patented Apr. 2, 1929.

1,707,310

UNITED STATES PATENT OFFICE.

WALLACE F. MacGREGOR, OF RACINE, WISCONSIN, ASSIGNOR TO J. I. CASE THRESHING MACHINE COMPANY, OF RACINE, WISCONSIN, A CORPORATION.

COMBINATION HARVESTER THRASHER.

Application filed March 24, 1923, Serial No. 627,248. Renewed October 24, 1927.

My invention relates to improvements in combination harvester-thrashers of the character disclosed in Reissue Letters Patent No. 16,378, issued July 6, 1926, upon my application, and more particularly to mechanism for controlling the movements of the thrasher and harvester sections of the machine in relation to each other, or adjusting the harvester independently of the thrasher, such mechanism being of comparatively simple character for the purpose, and consequently readily operable, all as will hereinafter more fully appear.

In the accompanying drawings, forming part hereof, Figure 1 is a side elevation indicating a combined thrasher and harvester with my improved controlling mechanism applied thereto; Fig. 2, an elevation showing a platform forming part of the thrasher and upon which my improvement is preferably mounted, as seen when standing at one side of the rear of the machine and looking forward; Fig. 3, a side elevation of my improvement showing the manner of attaching the same; Fig. 4, a side elevation, and Fig. 5 is a front elevation of a housing and gearing therein which I employ in carrying out my improvement.

In said drawings the portions marked, 5, indicate the thrasher and, 6, a harvester, which may be of any preferred form, the machine as a whole being operated by a motor, as 7.

The platform structure, 10, may be of any suitable arrangement provided with guard-rails, as 11, and braces, 12, for the accommodation and protection of an attendant during the operation of the machinery.

Upon the platform structure 10 I mount my improved controlling device, arranged and operating as follows: In the upper portion of housing, 14, (Figs. 4 and 5) I place a worm, 9, mounted upon a preferably square shaft, 16, the rear end of said shaft being mounted in a collar, 17, and the outer end thereof being provided with a tiller-wheel, 18. In the lower chamber of said housing 14 is a gear, 10', which meshes with said worm 9, said gearing being indicated in dotted lines. Housing 14, as will be understood, is preferably composed of two sections, 14', bolted or otherwise secured together as indicated in Fig. 5, and the housing as a whole is rigidly connected to the platform structure by the brace, 12', which engages lug, 20, on said housing. An arm, 21, is connected to gear wheel shaft, 19 upon which said gear 10' is mounted, and to a downwardly extending link, 22, which may be provided at its connection with shock absorbing springs, 23. To the lower end of link 22 an arm, 24, is pivotally connected and which I prefer to extend rearwardly to serve as a connecting-pin for the universal joint, 25, which connects the axle sections 26, 27, of the thrasher and harvester in a manner and for the purpose fully explained in the patent hereinbefore referred to; but I desire to be understood that said link 22 may be connected directly to the harvester 6 for manipulating the latter.

While the machine is traveling during harvesting it becomes necessary to raise and lower the harvester 6 to meet varying conditions of ground undulations and irregularities of crop growth, which I readily accomplish by manipulating the tiller-wheel 18. When turning said wheel slightly in one direction the arm 21 being actuated by the partial revolution of worm-wheel 10' is moved downwardly, at the same time forcing the link 22 and arm 24 in a downward direction, as indicated in dotted lines, Fig. 1, which movement causes said arm 24 through its connection with universal joint 25 to rock the continuous axle 26, 27, and when said wheel is turned oppositely the parts described move in the reverse or upward direction. The rocking or turning of said axle causes the balancing arms, 28, which are rigidly connected thereto and pivotally connected to the thrasher, to raise the thrasher, while the harvester 6 which is rigidly connected to axle section 27 by the members, 29, fixedly secured thereto, is simultaneously lowered by the rocking of said axle so that harvester 6 can be positioned as required within the approximate range of movement indicated by the full and dotted lines in Fig. 1, said movements of the thrasher and harvester through the rocking action of said axle being fully described in the patent referred to herein. In order to modify the range of movement of arm 24 I may provide the end thereof with adjustable means such as the holes, 30, for graduating the point of connection with the link.

I have described my improved controlling mechanism in connection with a harvester-thrasher embodying a continuous axle connecting the two elements, but desire it to be understood that the improvement comprehends its application to a harvester which is adjustable independently of the thrasher, that is, in such types where the thrasher frame does not raise and where it is desired only to vertically adjust the harvester; in other words, the harvester may be mounted on a rocking axle connected to the thrasher so that the harvester may be raised and lowered independently in relation to the thrasher, and the rocking or torsional movement of the harvester axle through the gear system aforementioned will be accomplished by manipulation of the wheel 18 or otherwise to raise and lower the harvester as desired.

In the manner described I provide a simple, positive and readily operable device for controlling the movements of the harvester in relation to the thrasher; and it will be understood that the employment of a worm and gear of the character used in my device insures that the movements of the harvester in raised or lowered positions will be limited and positively stopped after manipulation of the tiller-wheel 18, so that there is no necessity for locking, tripping or other complicated mechanisms requiring close attention, as a gear system substantially of the character described remains irreversible until actuated, and therefore the harvester will be constantly maintained in the position to which it has been adjusted without other locking means or manipulation by an operator, as indicated, and while I have specifically described a gear system for the purpose it will be understood that I may employ any suitable mechanism for controlling the vertical movement of the harvester through the connections between it and such mechanism.

I claim as my invention:

1. The combination, with a machine comprising a harvester and thrasher, of a vertically movable rigid element supported by said thrasher, means connected to said element for actuating the same in vertical direction, and means connected to said element and actuated thereby for raising and lowering said harvester.

2. The combination, with a machine comprising a harvester and thrasher, of a vertically movable element supported by said thrasher, an arm connected thereto, actuating mechanism to which said arm is connected, means for operating said actuating mechanism, and means connected to said vertical element and to said harvester for vertically adjusting the latter.

3. The combination, with a machine comprising a harvester and thrasher, of a shaft, a worm thereon, a gear-wheel meshing with said worm, an arm connected to said wheel, a link connected to said arm, an arm connected to said link and to said harvester, and means for operating said shaft to actuate said gear-wheel, link and arms for vertically adjusting said harvester.

4. The combination, with a combined harvester and thrasher comprising axle sections connected by a universal joint, of a rocker-arm constituting a connecting-pin for said joint, a link connected to said arm, a gear system, means connecting said link and gearing, and means for operating said gearing to actuate said rocker-arm for vertically adjusting said harvester.

5. The combination, with a combined harvester and thrasher, of an arm for adjusting the harvester section thereof, a link connected to said arm and having shock absorbing means, a gear system, means connecting said link and gearing, and means for operating said gearing to actuate said arm and link.

6. The combination, with a combined harvester and thrasher, of an arm for adjusting the harvester section thereof, a link connected to said arm, a gear system, means connecting said link and gearing, and means for operating said gearing to actuate said arm and link.

7. The combination, with a combined harvester and thrasher supported by a continuous axle, of an arm connected to said axle, a gear system, a link connected to said arm and gear system, and means for operating said gearing to actuate said link and arm for adjusting said harvester.

8. The combination, with a harvester and thrasher, of a graduated arm for adjusting the harvester section thereof, a link adjustably connected to said arm, a gear system, means connecting said link and gearing, and means for operating said gearing to actuate said arm.

9. The combination, with a harvester and thrasher, of means for controlling the vertical movements of the harvester comprising a worm-shaft, a worm-wheel meshing therewith, an arm connected to said wheel, a link connected to said arm and to said harvester, and means for rotating said worm-shaft to actuate said worm-wheel, arm and link for vertically adjusting said harvester.

10. In a machine of the class described, a thrasher, a harvester, a continuous axle connecting said elements, means for pivotally connecting said thrasher to said axle, means for connecting said harvester to said axle, and means supported by said thrasher and connected to said axle for vertically adjusting said harvester and said thrasher.

11. In a machine of the class described, a thrasher, a harvester, an axle connecting said elements, means for pivotally connecting said thrasher to said axle, means for rigidly connecting said harvester to said axle, and means supported by said thrasher and communicating with said harvester for vertically adjusting said elements in relation to each other.

12. In a machine of the class described, a thrasher, a harvester, an axle supporting the harvester and connected to the thrasher, means supported by the thrasher and connected to the harvester for vertically adjusting the harvester, mechanism connected to and actuating said adjusting means, and means for operating said actuating mechanism to raise and lower the harvester said actuating means remaining irreversible during the idleness of said operating means.

13. In a machine of the class described, a thrasher, a harvester, a rocking axle supporting the harvester and connected to the thrasher, a vertically movable element connected to the harvester, means connected to said element for actuating the latter said actuating means being normally irreversible and sustaining the harvester in fixed predetermined position, and means for operating said actuating means to impart motion to said element.

14. In a machine of the class described, a thrasher, a harvester, means connected to the thrasher for supporting the harvester, means connected to the thrasher and to the harvester for raising and lowering the latter in a vertical direction, mechanism connected to said raising and lowering means to impart motion thereto, and means for operating said mechanism to actuate the raising and lowering means to vertically adjust the harvester said mechanism being normally irreversible for sustaining the harvester in fixed predetermined position until the operating means is actuated.

In testimony whereof I affix my signature.

WALLACE F. MacGREGOR.